United States Patent [19]

Suvada

[11] Patent Number: 5,200,844
[45] Date of Patent: Apr. 6, 1993

[54] COLOR HEAD-UP DISPLAY SYSTEM

[75] Inventor: Thomas C. Suvada, Palos Verdes Estates, Calif.

[73] Assignee: Kaiser Aerospace & Electronics Corporation, Foster City, Calif.

[21] Appl. No.: 887,474

[22] Filed: May 22, 1992

[51] Int. Cl.⁵ .................. G02F 1/13; G09G 3/02; H04N 9/31

[52] U.S. Cl. ........................... 359/40; 359/53; 359/63; 359/65; 359/70; 359/94; 340/705; 353/31; 358/60

[58] Field of Search .............. 359/70, 40, 41, 53, 359/63, 65, 66, 94; 340/705, 814, 784; 353/31, 35; 358/60, 61, 90, 93

[56] References Cited

U.S. PATENT DOCUMENTS

| | | | |
|---|---|---|---|
| 3,781,465 | 12/1973 | Ernstoff et al. | 358/87 |
| 4,001,499 | 1/1977 | Dowell | 358/93 |
| 4,328,493 | 5/1982 | Shanks et al. | 340/784 |
| 4,756,604 | 7/1988 | Nakatsaka et al. | 359/41 |
| 4,991,941 | 2/1991 | Kalmanash | 359/94 |
| 5,050,966 | 9/1991 | Berman | 359/53 |

Primary Examiner—William L. Sikes
Assistant Examiner—Huy K. Mai
Attorney, Agent, or Firm—Marvin H. Kleinberg

[57] ABSTRACT

A field sequential color head-up display system includes image generating means including a source of light of at least two different wavelengths. A color selective polarizing filter having first and second absorption axes, enables the passage of linearly polarized light of first and second colors. Optical retardation imposed by variable optical retarding means determines the color of the light transmitted by circular polarizing means. Image collimating means apply a generated image of selected colors to an image combiner placed in the line of sight between an observer and a scene, thereby superimposing a generated image over the scene visible to the observer. Holographic elements tuned to the selected wavelengths improve reflection of those wavelengths to the observer.

20 Claims, 1 Drawing Sheet

COLOR HEAD-UP DISPLAY SYSTEM

BACKGROUND OF THE INVENTION

1. Field of the Invention

This invention relates in general to a method and apparatus for producing multi-color displays, and, more particularly, to a field sequential color head-up display system.

2. Description of the Related Art

It is well known in the prior art that an apparently monochromatic source, such as a cathode ray tube (CRT), can provide a multi-color display. From the earliest experiments in color television which used a rotating color wheel together with a CRT, it was possible to place images on the screen in synchronism with the color wheel so that a number of colors could be visualized. This phenomenon was as much a product of the persistence of the displayed image in the human eye as it was of the synchronization of certain displayed images with the concurrent presentation of a filter of preselected color.

The subsequent development of the shadow mask tube and the use of triads of monochromatic phosphors were deemed preferable improvements over the electromechanical color wheel and, as a result, the color television industry abandoned the electromechanical approach to color displays. It has been found in the past that a polychromatic source of light which appears to be monochromatic (from the mixing of colors) can provide images in both the principal colors and in colors which result from a mixture of the principal colors.

As early approach to an electronic field sequential color television system is described in U.S. Pat. No. 3,781,465 to Ernstoff et al. That patent shows a monochromatic cathode ray tube with a tri-color liquid crystal assembly that included red, blue and green cells. Electronic circuitry switches the three cells sequentially in a preselected order to provide a series of single color images in rapid succession that, due to image persistence in the human eye, give the appearance of being in full color.

A different approach in described in U.S. Pat. No. 4,003,081 to Hilsum et al. The approach in this reference is to select the cathode ray tube as a source of light that produces an image in at least two colors that are subsequently combined by an electrically controlled filter element. The active component of the filter is a liquid crystal material capable of separating an transmitting different colors through the filter depending upon the energizing control signals applied to control the filter element. In a preferred embodiment, video images from a first data source, such as radar, were to appear in one color while video images from a second data source, such as a computer, were presented in a second color. Alternative embodiments include a field sequential color display which includes a third filter so that a three color combination is possible.

U.S. Pat. No. 4,385,806 to Fergason, teaches a liquid crystal light shutter device used in combination with retarding wave plates to compensate for retardation in the light shutter device while it is operating under a control bias. By utilizing a control bias, the reference suggests that the operation of the liquid crystal light shutter device is speeded up, and that the retardation plates are compensated to account for the normal birefringence effects of the liquid crystal cells comprising the light shutter device.

In U.S. Pat. No. 4,436,376 to Fergason, a pair of liquid crystal cells are operated similar to a "push-pull" amplifier, in that each liquid crystal cell functions to impart its own phase shift to a passing optical beam. The application of a control bias to electrodes in each liquid crystal cell, aligns a preponderance of the liquid crystals in each of the cells, except for those liquid crystal layers immediately adjacent the electrodes. The reference states that application of incremental electrical signals across the conducting surfaces of the liquid crystal cell achieves a rapid on-off cycle for the cell. The cells thus taught are utilized as part of a communications link to modulate a light beam by means of applied electrical signals to the cells. Control signals that are 180° out of phase are applied to the two liquid crystal cells for "push-pull" operation.

The general idea of using a "black and white" cathode ray tube in conjunction with liquid crystal cells and color polarizers is described by Brinson et al in IBM Technical Disclosure Bulletin, Vol. 22, No. 5 of October, 1979. In order to provide a full three color capability, a first liquid crystal cell is followed by a first color polarizer and a second liquid crystal cell is followed by a second color polarizer. Essentially "white" light is transmitted through a linear polarizer and, depending upon the state of the first cell, either cyan or red is passed to the second cell. Depending on the state of this second cell, either blue or yellow is passed to the observer. The net output of the combination to an observer is then either blue, red, green, or black at any instant of time. During operation, the net colors would be "mixed" by having images persist through more than one output color phase to provide a substantially full palette of colors to the observer.

A slightly different approach was disclosed in U.S. Pat. No. 4,328,493 to Shanks et al. A cathode ray tube which emits at least two different colors is combined with first and second color selective polarizers, a liquid crystal cell and a neutral linear polarizer. The liquid crystal cell in one condition rotates the plane of applied polarized light and in a second condition transmits the light without rotation. The cell is the switched in synchronism with the presentation of the images that are to be seen in color. Because the cells cannot be switched between states in the time available during television transmissions, only one half of the cell is switched at a time and the electrodes are driven accordingly.

In the published U.K. patent application of Bos et al, GB 2 139 778 A, published Nov. 14, 1984, corresponding to a U.S. application Ser. No. 493,106, filed May 9, 1983, a field sequential color system is disclosed. In this reference, a liquid crystal cell functions as a variable optical retarder in a polarizing system and includes pleochroic filters which selectively transmit a first or a second color, depending upon the polarization of the light. A color sensitive polarizing means are placed in front of a cathode ray tube which is capable of emitting light of at least two colors. A first absorption axis passes linearly polarized light of the first color and a second absorption axis passes linearly polarized light of the second color. The liquid crystal cell is followed by a linear polarizer.

When the liquid crystal cell is driven by a first signal, it provides a half wave retardation to applied light. When driven by a second signal, substantially no retardation is experienced by the impinging light. With substantially no retardation of light, only light of one of the two colors can pass through the linear polarizer. With half wave retardation, only light of the other of the two colors can pass through the polarizer.

A specially designed liquid crystal cell functions as the variable optical retarder. The preferred cell is a nematic liquid crystal cell designed to be disinclination-free and to switched in a "bounce-free" manner as it is switched between its two states which alter the orientation of the surface non-contacting directors of the liquid crystal material in the cell.

There have been a number of attempts to modify the above described color technology for application to image generation and display systems, such as for use in head-up display systems.

In general, many vehicles, such as aircraft, have been fitted with optical systems that project an image which to the vehicle operator appears to be a part of the exterior scene that is viewed by the operator from the interior of the vehicle.

The earliest applications of this concept were gun sight aiming systems in which a target reticle was provided the vehicle operator for use in aligning the vehicle with a target thereby simultaneously aiming the vehicle's weapons systems at the selected target.

In recent years, with the advent of more sophisticated computer systems and symbol generation techniques, head up display systems have been used to place additional information in the field of view of the vehicle operator or pilot so that it becomes less necessary for the operator to look away from the exterior scene normally visible through the windscreen in order to glance at the instrument panel. Providing the head up display enables the pilot to pay more attention to the situation around him and avoids the need to refocus his eyes which would otherwise be required if the instrument panel were to be read.

Accordingly, in recent years, head-up display systems have become a vital part of the cockpit of fighter and attack aircraft, and, to a lesser extent, in commercial aircraft. Special head-up displays have been employed in some spacecraft and are in use in the space shuttle.

Prior art head-up displays, such as that shown in U.S. Pat. No. 4,001,499 to Dowell, include electronic image generating means which create a visible image on a cathode ray tube. Because of the crowded conditions in the instrument panel, and the generally elongated shape of the cathode ray tube, the display assembly is usually packaged in a substantially rectangular box that is placed with its long axis generally parallel the axis of the aircraft. The image produced on the face of the cathode ray tube will then be somewhat below the line of the pilot's normal view through the windscreen.

The image thus generated by this display system is then projected vertically to a semi-reflective combiner screen through which the pilot views the windscreen and the scene exterior thereto. To the pilot's eye the exterior scene then appears with the generated images superimposed thereon.

In spite of all the prior art known to the applicant and that discussed above, no prior art reference discloses a field sequential color head up display system that is sufficiently compact in size and flexible enough to be controlled or modified through programmable software. Similarly, no prior art reference teaches a multicolor cathode ray tube having sufficient brightness and resolution to provide a practical image generation source of light for use in field sequential color head up display systems.

The present invention discloses a practical and successful field sequential color head up display system that remedies the shortcomings of the prior art.

SUMMARY OF THE INVENTION

In general, in a field sequential color head up display system, the present invention provides image generating means having a source of light of at least two different wavelengths. Light polarizing means are in optical communication with this light source. A color selective polarizing filter, having first and second substantially orthogonally oriented absorption axes, is included in the light polarizing means. The first absorption axis of the color selective polarizing filter passes linearly polarized light of a first color and the second absorption axis passing linearly polarized light of a second color.

Circular polarizing means are in optical communication with the light polarizing means for selectively transmitting light of a color determined by the amount by which the light emitted by the source is optically retarded. Variable optical retarding means are disposed between the color selective polarizing filter and the circular polarizing means for retarding light applied to the circular polarizing means. Control means are coupled to the variable optical retarding means for controlling the amount of optical retardation imposed by the retarding means upon light transmitted therethrough, whereby the retarding means, is capable of at least first and second retardations resulting in the emission of light of at least first and second colors.

Image collimating means are in optical communication with the circular polarizing means for applying an image generated by the image generating means to an image combining means positioned in the line of sight between an observer and a scene to provide a superposition of a generated image over the scene visible to the observer. Optical wavelength enhancement means are in optical communication with the image collimating means and the image combining means for enhancement of the reflectivity on the image combining means of the wavelengths of light generated by the light source, whereby generated images appear to the observer as if they were located at infinity so that scenes visible to the observer through the image combining means appear to include the generated images.

The novel features of construction and operation of the invention will be more clearly apparent during the course of the following description, reference being had to the accompanying drawing wherein has been illustrated a preferred form of the device of the invention and wherein like characters of reference designate like parts throughout the drawing.

DESCRIPTION OF THE PREFERRED EMBODIMENTS

Figure 1:
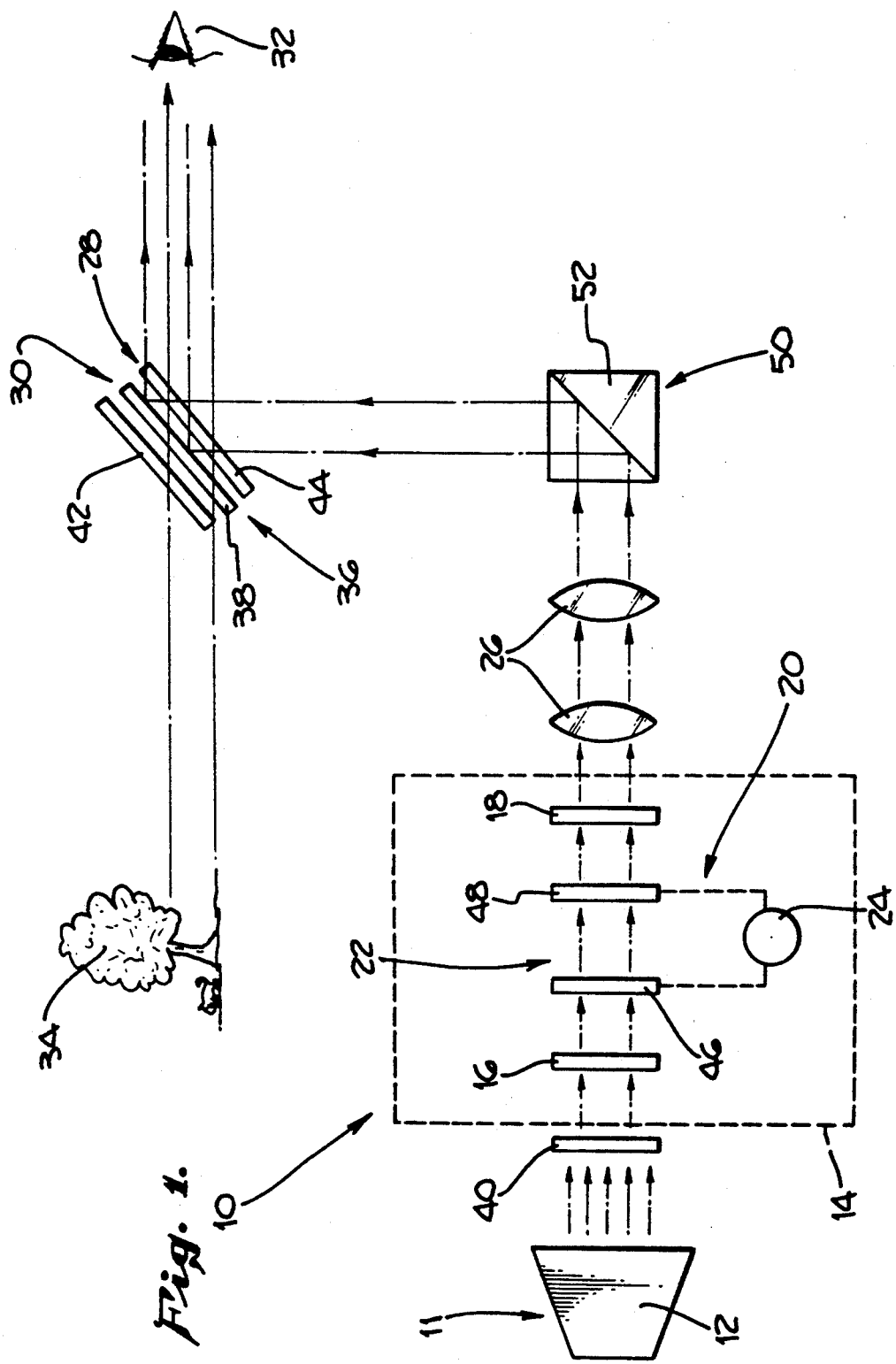
FIG. 1 is a developed diagrammatic view of the elements of field sequential color head up display constructed in accordance with the present invention.

A field sequential color head-up display system 10, constructed in accordance with the present invention, would include image generating 11 means such as a dual phosphored cathode ray tube 12 that provides a source of light of at least two separated wavelengths in the visible spectrum. One preferred dual phosphored cathode ray tube uses a mixture of P53 and P56 phosphors. The writing rate of a preferred cathode ray tube as described immediately preceding, would be approximately 7,500 inches per second, but could be varied depending on the phosphors used in the cathode ray tube chosen for the system.

Light polarizing means 14 are in optical communication with cathode ray tube 12. Light polarizing means 14 preferably include a color selective polarizing filter 16 having first and second substantially orthogonally oriented absorption axes. The first absorption axis of filter 16 passes linearly polarized light of a first color and the second absorption axis passes linearly polarized light of a second color.

Circular polarizing means 18 are in optical communication with light polarizing means 14, for selectively transmitting light of a color determined by the amount by which the light emitted by cathode ray tube 12 is optically retarded.

Variable optical retarding means 20 are disposed between color selective polarizing filter 16 and circular polarizing means 18 for retarding light applied to circular polarizing means 18. Variable optical retarding means 20 includes a liquid crystal light valve means 22. Preferably, liquid crystal light valve means 22 comprise first and second liquid crystal cells 46 and 48 and may be fabricated of dichroic, cholesteric or any of the known chemicals having the required light polarizing and retarding characteristics necessary.

Control means 24 are coupled to variable optical retarding means 20 for controlling the amount of optical retardation imposed by variable optical retarding means 20 upon light transmitted therethrough. Likewise, control means 24 includes preferably a source of electric potential at preselected first and second levels, as well as means for applying to each of cell 46 and 48 the preselected electric potential levels in order to control the amount of optical retardation imposed by each of cells 46 and 48.

In this preferred arrangement, variable optical retarding means 20 are capable of at least first and second retardations resulting in the emission of light of at least first and second colors.

With the above described preferred embodiment, the source of light from cathode ray tube 12 is adapted to be modulated in synchronism with control means 24 by switching between the first and second colors of light at a rate higher than the flicker threshold of a human eye, about 50 Hertz or 20 milliseconds. In this manner the images generated by the cathode ray tube 12 source of light appear to an observer to be constant and contain both of the first and second colors.

Image collimating means 26 are in optical communication with the circular polarizing means 18 for applying an image generated by image generating means 11 to an image combining means 28.

Preferably, image combining means 28 have a diffractive combiner means 30 positioned in the line of sight between an observer 32 and a scene 34 to provide a superposition of a generated image over the scene 34 visible to the observer 32.

Optical wavelength enhancement means 36 is in optical communication with image collimating means 26 and with image combining means 28 for enhancement of the reflectivity on image combining means 28 of the wavelengths of light generated by the cathode ray tube 12 light source.

In the preferred embodiment of the invention, optical wavelength enhancement means 36 include a tuned holographic means 38 in optical communication with image collimating means 26 for enhancing the reflectivity on the diffractive combiner means 30 of the wavelengths of light generated by the cathode ray tube 12 source of light. The use of tuned holographic means 38 enhances the reflectivity of specific wavelengths of light generated by cathode ray tube 12 on diffractive combiner means 30, and thereby generated images appear to the observer 32 as if they were located at infinity, so that scenes visible to the observer 32 through the image combining means 28 appear to include the generated images.

While image combining means 28 may include a single screen, it preferably includes first and second screens, 42 and 44 respectively, each having a surface shape adapted to reflect images generated by image generating means 11 and to allow transmission of ambient light therethrough. First and second screens 42 and 44 are optically tuned to reflect light of at least one of the wavelengths produced by the cathode ray tube 12 source of light efficiently.

As there may preferably be more than one screen in image combining means 28, there may also be more than one tuned hologram in the tuned holographic means 38. Each of the holograms would be associated with one of the screens of image combining means 28 and "tuned" to optically enhance a specific desired wavelength of light while not affecting the pass-through of other wavelengths of light from the scene 34.

Filter means 40 in the optical path between cathode ray tube 12 acting as a source of light and the output of image collimating means 26 limit emitted light to the first and second colors of light at the image combining means 28. The purpose of filter means 40 is to eliminate or attenuate unwanted colors of light from the output of the image collimating means 26 and to improve display contrast by reducing reflected ambient light without substantially affecting display brightness.

Light ray directing means 50, such as a prism 52, may be used in the system 10 to direct the desired output of the cathode ray tube 12 or any of the subsequent devices to the desired viewing location.

The invention described above is, of course, susceptible to many variations, modifications and changes, all of which are within the skill of the art. It should be understood that all such variations, modifications and changes are within the spirit and scope of the invention and of the appended claims.

Similarly, it will be understood that it is intended to cover all changes, modifications and variations of the example of the invention herein disclosed for the purpose of illustration which do not constitute departures from the spirit and scope of the invention.

What is claimed as new is:

1. A field sequential color head-up display system, comprising:
   image generating means having a source of light of at least two different wavelengths;
   light polarizing means in optical communication with said source, including a color selective polarizing filter having first and second substantially orthogonally oriented absorption axes, the first absorption axis passing linearly polarized light of a first color and the second absorption axis passing linearly polarized light of a second color;

circular polarizing means in optical communication with said light polarizing means for selectively transmitting light of a color determined by the amount by which the light emitted by said source is optically retarded;

variable optical retarding means disposed between said color selective polarizing filter and said circular polarizing means for retarding light applied to said circular polarizing means;

control means coupled to said variable optical retarding means for controlling the amount of optical retardation imposed by said retarding means upon light transmitted therethrough, whereby said retarding means are capable of at least first and second retardations resulting in the emission of light of at least first and second colors;

image collimating means in optical communication with said circular polarizing means for applying an image generated by said image generating means to an image combining means positioned in the line of sight between an observer and a scene to provide a superposition of a generated image over the scene visible to the observer; and optical wavelength enhancement means in optical communication with said image collimating means and said image combining means for enhancement of the reflectivity on said image combining means of the wavelengths of light generated by said light source whereby generated images appear to the observer as if they were located at infinity so that scenes visible to the observer through the image combining means appear to include the generate images.

2. The field sequential color head-up display system of claim 1 in which the light emitted from said source is modulated in synchronism with said control means to produce images appearing to have a multi-colored appearance.

3. The field sequential color head-up display system of claim 1 wherein said synchronized modulation of aid source of light includes switching between said first and second colors of light at a rate higher than the flicker threshold of a human eye about 50 Hertz or 20 milliseconds, so that the images generated by said source of light appear to said observer to be constant and contain both of said first and second colors.

4. The field sequential color head-up display system of claim 1 including filter means in the optical path between said source of light and the output of said image collimating means for limiting emitted light to said first and second colors of light at said image combining means, to eliminate unwanted colors of light from the output of said image collimating means and to improve display contrast by reducing reflected ambient light without substantially affecting display brightness.

5. The field sequential color head-up display system of claim 1 in which the variable optical retarding means comprises first and second liquid crystal cells and said control means includes a source of electric potential at first and second levels and means for applying to each of said cells said electrical potential levels for determining the amount of optical retardation imposed by each of said cells.

6. The field sequential color head-up display system of claim 1 wherein said optical wavelength enhancement means include tuned holographic means in optical communication with said image collimating means and said image combining means for enhancing the reflectivity on said image combining means of the wavelengths of light generated by said light source.

7. The field sequential color head-up display system of claim 1 wherein said image combining means includes diffractive combiner means.

8. The field sequential color head-up display system of claim 7 wherein said image combining means include a first screen having a surface shape adapted to reflect said images generated by said image generating means and to allow transmission of ambient light therethrough.

9. The field sequential color head-up display system of claim 8 wherein said image combining means further include a second screen having a surface shape adapted to reflect said images generated by said image generating means and to allow transmission of ambient light therethrough, each of said first and second screens being optically tuned to efficiently reflect light of at least one of said wavelengths produced by said source of light.

10. The field sequential color head-up display system of claim 1 wherein said source of light is a cathode ray tube.

11. The field sequential color head-up display system of claim 10 wherein said cathode ray tube is a dual phosphored cathode ray tube using a mixture of P53 and P56 phosphors to provide light of at least two separated wavelengths in the visible spectrum.

12. The field sequential color head-up display system of claim 11 wherein said cathode ray tube has a writing rate of about 7,500 inches per second.

13. The field sequential color head-up display system of claim 1 wherein said variable optical retarding means include liquid crystal light valve means.

14. The field sequential color head-up display system of claim 13 wherein said liquid crystal light valve means are dichroic liquid crystal filter means.

15. The field sequential color head-up display system of claim 13 wherein said liquid crystal light valve means are cholesteric liquid crystal filter means.

16. A field sequential color head-up display system, comprising:

image generating means including a multi-phosphored cathode ray tube to generate light of at least two colors at separated wavelengths in the visible spectrum;

filter means positioned in the optical path of images generated by said cathode ray tube for limiting emitted light to predetermined first and second colors of light for eliminating unwanted colors of light from the output of said cathode ray tube and to improve display contrast by reducing ambient light reflected from said cathode ray tube face without substantially affecting display brightness;

linear polarizing means in optical communication with said image generating means, including a color selective polarizing filter having at least two absorption axes for respectively passing linearly polarized light of the predetermined at least first and second colors;

variable optical retarding means including liquid crystal light valve means disposed in the optical path adjacent said color selective polarizing filter for retarding linearly polarized light applied thereto;

control means coupled to said variable optical retarding means for controlling the amount of retardation imposed upon light transmitted therethrough, said retarding means being capable of at least first and second retardations corresponding to a selection of light of at least said first and second predetermined colors;

circular polarizing means in optical communication with said linear polarizing means for selectively transmitting light of a color determined by the amount by which the light emitted by said cathode ray tube is optically retarded;

image collimating means in optical communication with said circular polarizing means for applying a generated image to image combining means;

image combining means having at least one diffractive combiner element positioned in the line of sight between an observer and a scene to provide the superposition of a generated image, apparently at infinity, over the scene normally visible to the observer; and optical wavelength enhancement means in optical communication with said image collimating means and said image combining means for enhancement of the reflectivity by said image combining means of the colors at the predetermined wavelengths of light generated by said light source, including tuned holographic means, whereby scenes observed through the image combining means appear to include the generated images.

17. Image generating means having a source of light that emits light rays of a plurality of colors including first and second substantially different primary colors;

light switching means in optical communication with said light source for selectively transmitting therethrough a light output of either said first color, said second color, or a composite color containing both said first and second colors; and image combining means in optical communication with said light switching means output, positioned in the line of sight between an observer and a scene to superimpose a generated image over the scene visible to the observer, said image combining means having first and second diffractive filter means tuned to reflect light of said first and second colors, respectively.

18. The image generating means of claim 17, above, wherein said first and second diffractive filter means each include a reflecting hologram tuned to said first and second colors, respectively.

19. The image generating means of claim 17, above, wherein said cathode ray tube source of light is adapted to be modulated in synchronism with said control means by switching between said predetermined first and second colors of light at a rate higher than the flicker threshold of the human eye, about 50 Hertz or 20 milliseconds, so that the images generated by the cathode ray tube source of light appear to an human observer to be constant and to contain both said first and second colors.

20. The image generating means of claim 17, above, wherein said cathode ray tube source of light is adapted to be modulated in synchronism with said control means by switching among predetermined colors including combinations of colors at a rate higher than the flicker threshold of the human eye, about 50 Hertz or 20 milliseconds, so that the images generated by the cathode ray tube source of light appear to an human observer to be constant and to contain a combination all colors which can be produced by the cathode ray tube.

* * * * *